US009519590B1

(12) United States Patent
Armangau et al.

(10) Patent No.: US 9,519,590 B1
(45) Date of Patent: Dec. 13, 2016

(54) MANAGING GLOBAL CACHES IN DATA STORAGE SYSTEMS

(75) Inventors: Philippe Armangau, Acton, MA (US); Christopher Seibel, Walpole, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 216 days.

(21) Appl. No.: 13/533,311

(22) Filed: Jun. 26, 2012

(51) Int. Cl.
*G06F 12/00* (2006.01)
*G06F 13/00* (2006.01)
*G06F 13/28* (2006.01)
*G06F 12/08* (2016.01)
*G06F 12/12* (2016.01)

(52) U.S. Cl.
CPC ....... *G06F 12/0866* (2013.01); *G06F 12/0871* (2013.01); *G06F 12/122* (2013.01)

(58) Field of Classification Search
CPC .... G06F 12/0866; G06F 12/0284; G06F 9/52; G06F 17/30168; G06F 17/30171; G06F 17/30359; G06F 17/30362; G06F 12/14; G06F 12/1466; G06F 12/084; G06F 12/0871; G06F 12/121; G06F 12/122

USPC ........ 711/133, 113, 118, 130, 159, 145, 104, 711/138–139, 136, 137; 707/827, 966; 709/201, 709/203

See application file for complete search history.

(56) References Cited

U.S. PATENT DOCUMENTS

| | | | | |
|---|---|---|---|---|
| 6,141,731 | A * | 10/2000 | Beardsley et al. | 711/136 |
| 6,732,124 | B1 * | 5/2004 | Koseki et al. | 707/202 |
| 7,237,061 | B1 * | 6/2007 | Boic | 711/113 |
| 2005/0071569 | A1 * | 3/2005 | Iyengar et al. | 711/133 |
| 2009/0282187 | A1 * | 11/2009 | Ito et al. | 711/103 |

* cited by examiner

*Primary Examiner* — Yaima Rigol
*Assistant Examiner* — Shane Woolwine
(74) *Attorney, Agent, or Firm* — Krishnendu Gupta; Jason A. Reyes; Deepika Bhayana

(57) ABSTRACT

A method is used in managing global caches in data storage systems. A cache entry of a global cache of a data storage system is accessed upon receiving a request to perform an I/O operation on a storage object. The cache entry is associated with the storage object. Accessing the cache entry includes holding a reference to the cache entry. A determination is made as to whether the I/O operation is associated with a sequential access. Based on the determination, releasing the reference to the cache entry is delayed.

20 Claims, 8 Drawing Sheets

MANAGING GLOBAL CACHES IN DATA STORAGE SYSTEMS

BACKGROUND

Technical Field

This application relates to managing global caches in data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

The performance of applications is heavily influenced by the speed with which an application can retrieve data. As such, it is important to cache as much data as possible to improve performance of the data storage system.

Although existing various methods provide reasonable means of caching and accessing cached data and/or metadata of file systems, with the explosion in the amount of data being generated, the number of resources required for managing access to data and/or metadata of file systems cached in global caches of data storage systems are rising dramatically thereby causing increase in read and write I/O response times and decreases in I/O performance of an I/O request.

SUMMARY OF THE INVENTION

A method is used in managing global caches in data storage systems. A cache entry of a global cache of a data storage system is accessed upon receiving a request to perform an I/O operation on a storage object. The cache entry is associated with the storage object. Accessing the cache entry includes holding a reference to the cache entry. A determination is made as to whether the I/O operation is associated with a sequential access. Based on the determination, releasing the reference to the cache entry is delayed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
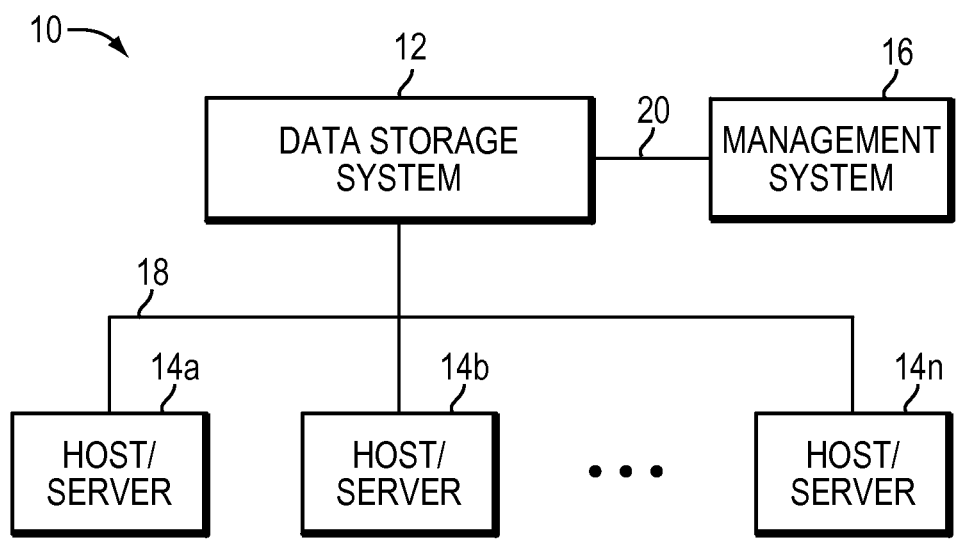
FIGS. 1-3 are examples of an embodiment of a computer system that may utilize the techniques described herein.

Described below is a technique for use in managing global caches in data storage systems, which technique may be used to provide, among other things, accessing a cache entry of a global cache of a data storage system upon receiving a request to perform an I/O operation on a storage object, where the cache entry is associated with the storage object, where accessing the cache entry includes holding a reference to the cache entry, determining whether the I/O operation is associated with a sequential access, and based on the determination, delaying releasing the reference to the cache entry.

Generally, a file system data that is read from disks and written to disks is cached in a volatile memory of a data storage system. Caching of the file system data implies that read operations read the file system data from the volatile memory, rather than from a physical disk. Correspondingly, write operations may write the file system data to the volatile memory rather than to the disk. Further, a file system data may include metadata of files of the file system and contents of the files. A buffer cache pool is created from a portion of a volatile memory of a data storage system where the portion of the volatile memory is apportioned into buffer cache objects (also referred to as "buffer cache page" or "buffer cache block") in such a way that each buffer cache object is represented by a buffer cache descriptor. The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool. The buffer cache pool caches metadata of a file system which includes directory contents, file status information (e.g., access time, last modification time, size, permission bits), and file system structures (such as indirect blocks, inode, cylinder group blocks and per-block metadata).

The buffer cache pool is created when file server 23 is initialized during a boot sequence. Further, during initialization of file server 23, a buffer cache descriptor table is created for managing buffer cache blocks of the buffer cache pool. The buffer cache descriptor table includes a buffer cache descriptor entry for each buffer cache block created for the buffer cache pool. A buffer cache descriptor entry associated with a buffer cache block includes information about the buffer cache block. The information may include the physical address of the buffer cache block, as well as an identifier of a buffer cache queue to which the buffer cache block is allocated.

Further, a buffer cache descriptor includes information such as nhold and generation counts that help label the buffer cache block with a revision number for creating a hint for the buffer cache block. Additionally, a buffer cache descriptor includes a link to a data block allocated from the volatile memory module indicating address of the data block. Further, data and/or metadata of a file system may be cached in a global cache such that the data and/or metadata of the file system is cached in a set of buffer cache blocks managed by a set of global buffer cache descriptors. Further, when a client accesses a buffer cache block from a global cache, a reference is taken on the buffer cache which is released when the client finish accessing the buffer cache block. Further, one or more clients may access a buffer cache block of a global cache by using a reference count mechanism. When a reference of a buffer cache block reaches zero indicating that the buffer cache block is not accessed by any client, the buffer cache block is added to a global reusable list which may be maintained in a least recently used manner. A buffer cache block that has been added to a global reusable list may either be reclaimed or reused by a client that has added the buffer cache block back to the global reusable list by releasing a reference to the buffer cache block. Further, a buffer cache block that has been added to a global reusable list may be reused by another client.

Generally, data and/or metadata of a file system is referred to and updated frequently, thus caching data and/or metadata of the file system in a volatile memory of a data storage system improves I/O performance of the file system. Thus, an application may access data and/or metadata stored in the volatile memory, thereby avoiding or reducing the need to retrieve data and/or metadata of the file system from a disk. Further, metadata of a file system includes a mapping of a logical address of data of the file system to a physical address of data of the file system. Thus, caching as much data and/or metadata of a file system as possible in a volatile memory of a data storage system increases I/O performance of the file system.

Generally, a mechanism of lists and "hints" is used to manage buffer cache blocks of the buffer cache pool. In a data storage system using the mechanism of lists and hints, a buffer cache block is allocated to store data and/or metadata of a file system so that the file system may access the buffer cache pool to retrieve the data and/or metadata when performing I/O operations on the file system. In such a system, when a buffer cache block that is allocated for storing metadata is released, the buffer cache block is labeled with a revision number, and the buffer cache block is added to a global reusable list (or queue) in a least recently used manner. The process of labeling a buffer cache block with a revision number before releasing the buffer cache block is known as creating a "hint" for the buffer cache block. Creating a hint for a buffer cache block enables an application to access information stored in the buffer cache block even after the buffer cache block has been released as long as the buffer cache block has not been reused. Additionally, buffer cache blocks released to the global reusable list may be reused to store data and/or metadata of a file system when the buffer cache pool does not have free buffer cache blocks available for allocation. The process of reusing released buffer cache blocks is also known as "recycling", which is performed by removing a buffer cache block from the global reusable list in the least recently used manner such that the removed buffer cache block represents the first buffer cache block that has been released to the global reusable list compared to other buffer cache blocks existing on the global reusable list. Thus, a buffer cache block removed from the global reusable list in the least recently used manner represents the oldest buffer cache block on the global reusable list that has been referenced by an application. Consequently, the oldest buffer cache block is least likely to be referenced by the application again at a later time. When a buffer cache block is reused from the global reusable list in the least recently used manner, the revision number of the buffer cache block is updated to indicate that the hint of the buffer cache block is no longer valid. Thus, in such a case, contents of the buffer cache block may no longer be retrieved by simply accessing the buffer cache block.

Generally, if an application performing I/O operations on a file system requires access to metadata and/or data of the file system stored in a buffer cache block cached in a global cache of a data storage system that has been released to a global reusable list in a least recently used manner, the application may retrieve the released buffer cache block by using the revision number ("hint") of the buffer cache block. If the buffer cache block has not been recycled (i.e., the hint is deemed valid), the buffer cache block is removed from the least recently used list and provided to the application. However, if the buffer cache block has been recycled, the buffer cache block may not be retrieved at all as the revision of the buffer cache block indicates that the hint created for the buffer cache block is no longer valid, which in turn means that contents (data and/or metadata) of the buffer cache block may have changed.

Generally, a I/O request is executed by reading data from a persistent storage into a buffer of the buffer cache pool if the data is not already cached and completing the I/O request by performing the I/O operation on the data read into the buffer. A global cache is used to improve I/O performance and decrease read and write I/O latency by caching data and/or metadata of a file in the global cache, logging the changes in a data transaction log, and flushing (also referred to herein as "committing") the changes to a storage device at a later time. Further, a global cache may maintain a global list of reusable cache entries in a least recently used manner such that the cache entries are available for use by clients of the global cache.

Conventionally, when a file system uses a cache entry of a global cache as a result of an I/O operation (e.g., read, write), the cache entry is removed from a global list (e.g., least recently used list) of reusable cache entries of the global cache that are available for use by clients. Thus, in such a conventional system, each time a cache entry which is a part of a global list of reusable cache entries is used for an I/O operation, the cache entry is removed from the global list of reusable cache entries by taking a reference to the cache entry. Further, when the reference to the cache entry is released, the cache entry is added back to the global list of reusable cache entries at a later time after the I/O operation has been completed. Further, in such a conventional system, when a cache entry is removed from a global list of reusable cache entries, a global system lock is used for providing consistent access to the cache entry. Thus, in such a conventional system, a global system lock is acquired (also referred to herein as "locked") before removing a cache entry from a global list of reusable cache entries and the global system lock is released (also referred to herein as "unlocked") after removing the cache entry from the global list of reusable cache entries. Further, in such a conventional system, a global system lock is again acquired before adding back a cache entry to the global list of reusable cache entries that has been previously removed from the global list of reusable cache entries and the global system lock is released after adding the cache entry back to the global list of reusable cache entries. Thus, in such a conventional system, a global system lock is acquired and released at least twice each time a cache entry of a global list of reusable cache entries is accessed by a client as a result of an I/O operation. As a result, in such a conventional system, if a file system accesses a set of file system blocks in a sequential access pattern, a single cache entry including metadata and/or data for the set of file system blocks may be repeatedly removed and added back to a global list of reusable cache entries cached in a global cache thereby causing a significant increase in the number of times a global system lock is acquired and released. Thus, in such a conventional system, I/O performance of a file system is decreased because of repeated locking and unlocking operations performed on a system lock thereby degrading performance of a processor of a data storage system.

In at least some implementations in accordance with the technique as described herein, the use of the managing global caches in data storage systems technique can provide one or more of the following advantages: reducing the I/O load on a data storage system by efficiently performing I/O operations directed to file systems, improving the I/O performance by enabling a data storage system to efficiently perform an I/O operations (e.g., read, write), decreasing I/O latency (also referred to herein as "a response time") for an I/O operation directed to a file system by efficiently managing a global cache, and reducing CPU contention of a data storage system by decreasing the number of times a system lock is acquired and released.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
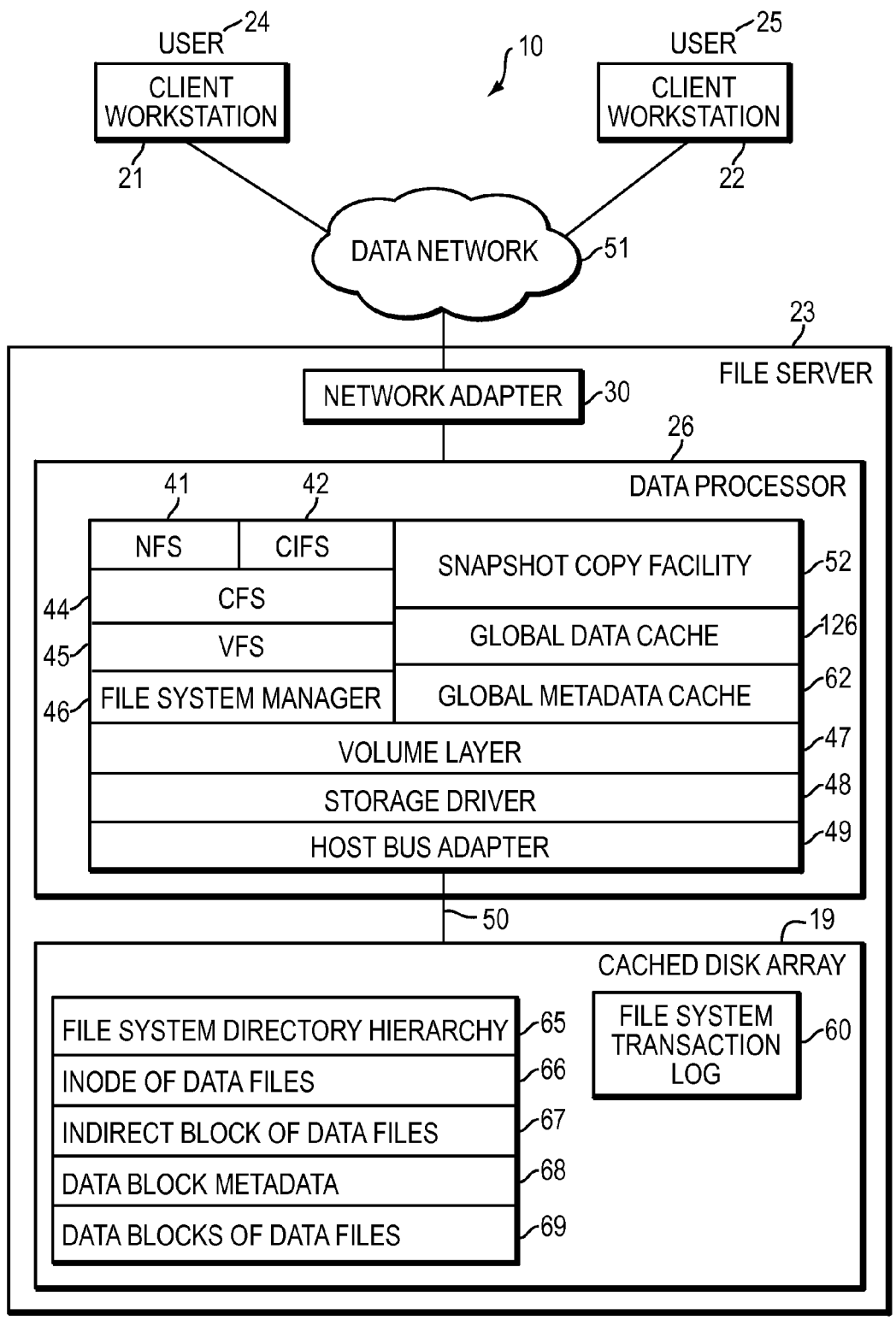

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

In at least one embodiment of the current technique, a global cache may store data and/or metadata of a file of a file system in a volatile memory of data storage system 10. Further, a global cache may be initialized at the time file server 23 is initialized. A global cache may be created in a volatile (e.g., Direct Random Access Memory (DRAM) of file server 23. Further, a global cache may also be created in a nonvolatile memory of file server 23. Further, in at least one embodiment of the current technique, a nonvolatile memory may include a flash memory (e.g. solid state drives, EEPROM (electrically erasable programmable read-only memory)). Further, it should be noted that a global cache may include a global data cache 126 and a global metadata cache 62. Further, a global cache may cache both data and metadata of a file system.

Figure 3:
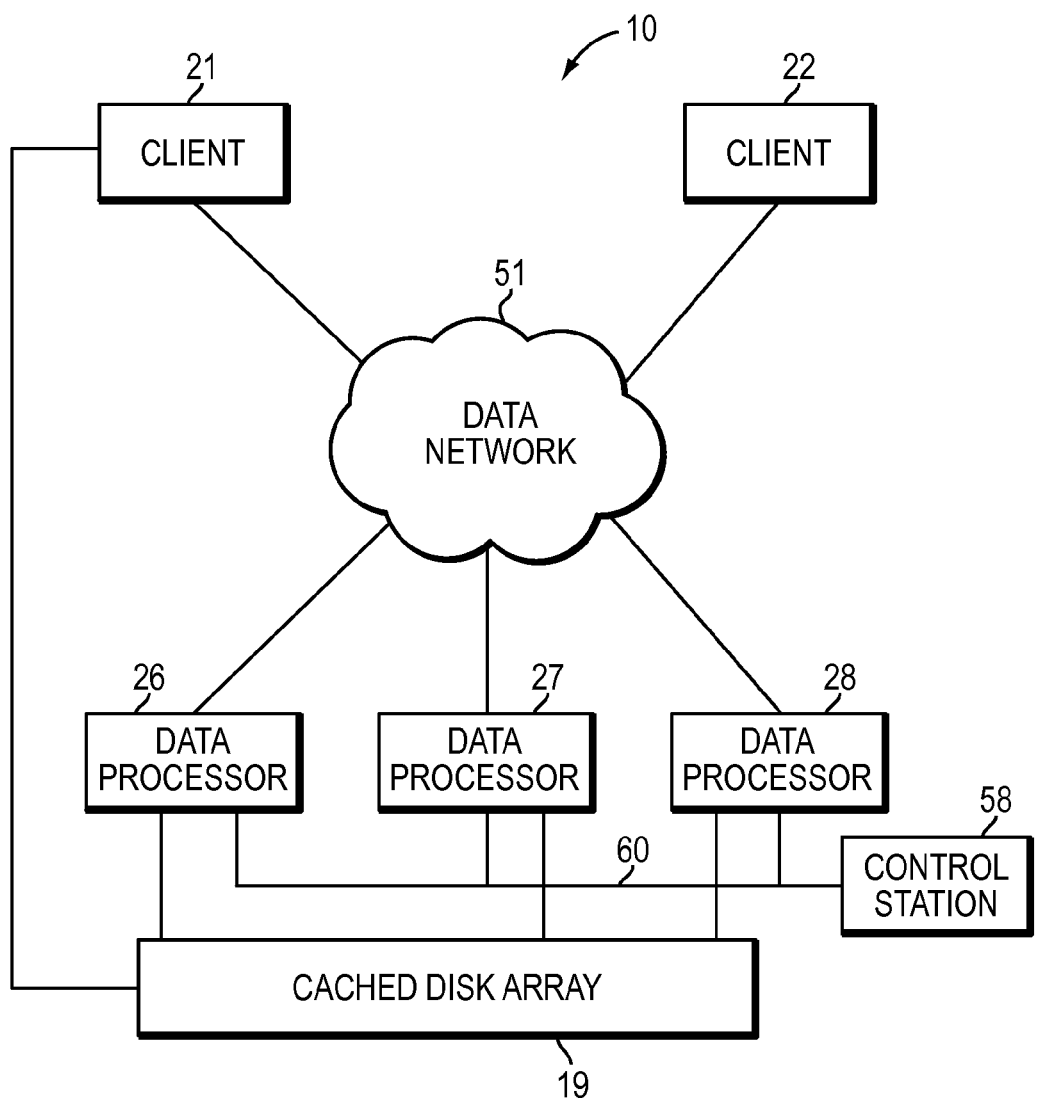

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
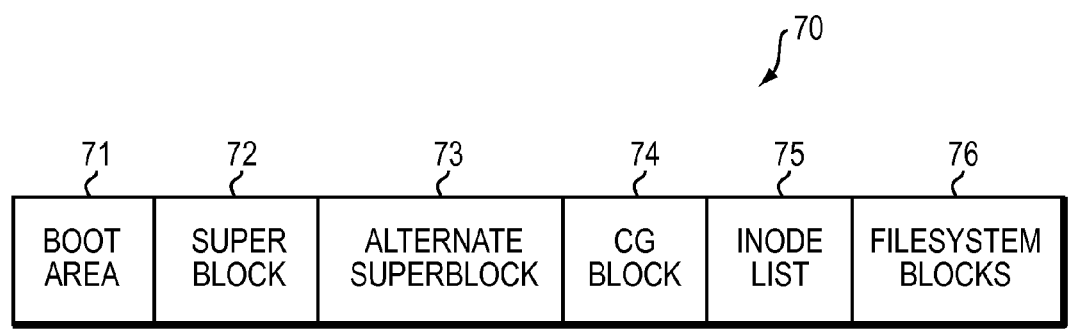
FIGS. 4-7 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism A file is uniquely identified by a file system identification number in file server 23. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Figure 5:
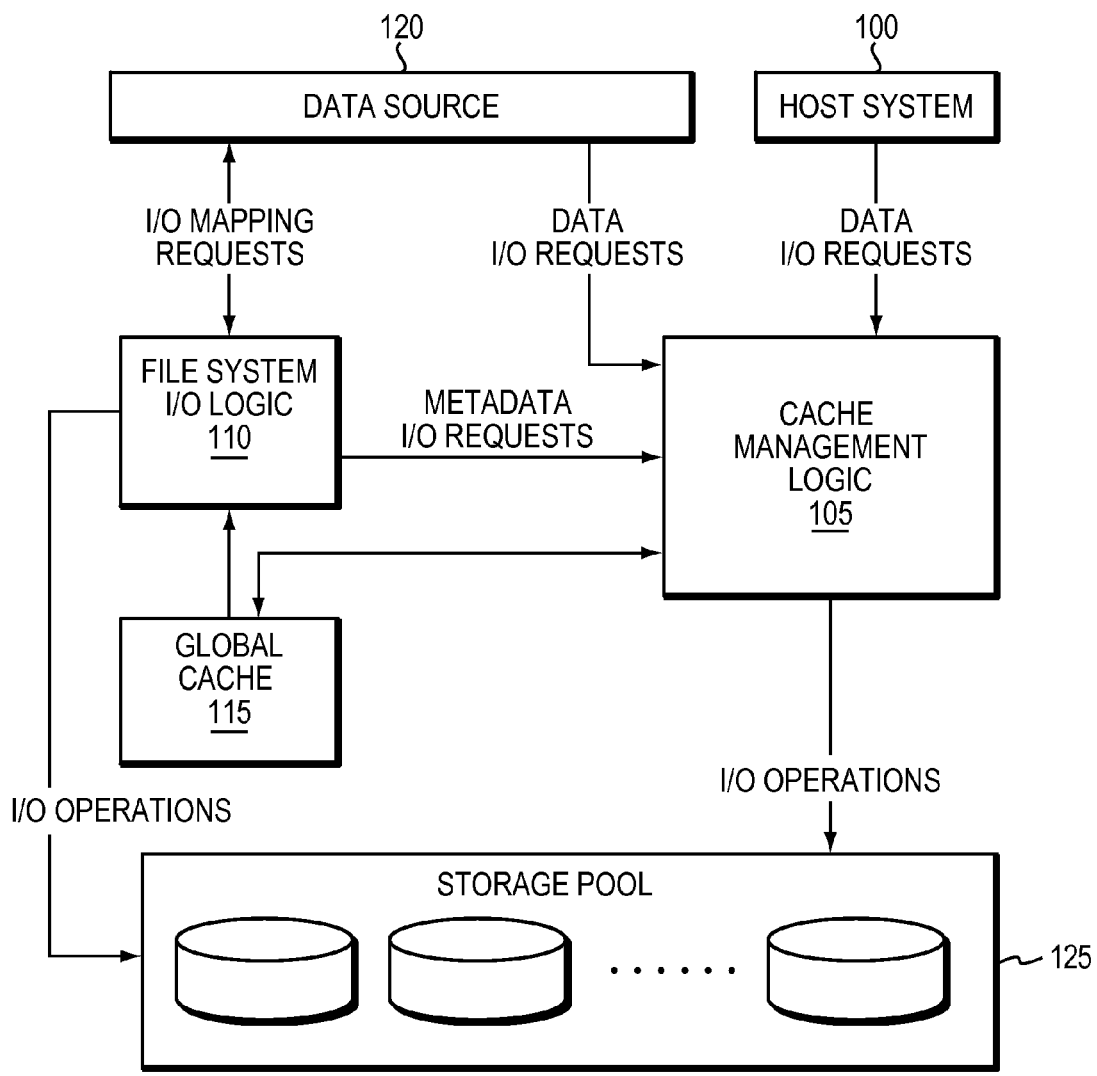

Referring to FIG. 5, shown is a detailed representation of components that may be included in an embodiment using the techniques described herein. In at least one embodiment of the current technique, a client (e.g., data source 120, host system 100) access a file system using any one of data access protocols by issuing an I/O request (e.g., read, write) to the file system. With reference also to FIGS. 1-4, file system I/O logic 110 (also referred to herein as "UFS" or "UFS64") provides functionality for creating and hosting a file system in a data storage system. Further, file system I/O logic 110 provides a set of interfaces for accessing and managing files of a file system, and maintaining consistent mapping for the files of the file system. File system cache management logic 105 (also referred to herein as "Common File System" or "CFS") provides a functionality and a set of interfaces for accessing and managing files of a file system. CFS 105 includes mapping information that maps an offset of a file to a global data block cache descriptor associated with a file system block that is cached in the global cache 115.

In at least one embodiment of the current technique, host system 100 is configured to use a LUN on a data storage system. Further, data source 120 uses a mapped LUN on the data storage system in such a way that data source 120 retrieves mapping information for the mapped LUN from a file system that configures the mapped LUN by issuing I/O mapping requests to file system I/O logic 110. Consequently, data source 120 uses the mapping information for performing an I/O operation on the data storage system. Further, in such a case, a write mapping operation or an operation that modifies the file system hosting the mapped LUN may result in changes to data and/or metadata of the file. Thus, an I/O request directed to the file system issued by data source 120 may result into a set of data I/O operations associated with changes to data of the file system and a set of metadata I/O operations associated with changes to metadata of the file system. Further, file system I/O logic 110 may cache the changes to metadata in a memory (e.g., global cache) of a data storage system as a set of dirty buffers and store information regarding the changes in metadata in a file system transaction log. Further, a flush operation such as a file sync operation may update on-disk contents of the file system at a later time by flushing the changes to metadata from the file system cache to a storage device of storage pool 125 that stores the on-disk contents of the file system.

In at least one embodiment of the current technique, global cache 115 caches a set of file system blocks of a file system in a memory of file server 23 by managing a set of buffer cache descriptors such that each buffer cache descriptor may be mapped to a buffer cache block of the buffer cache pool such that the buffer cache block may store a file system block of the set of file system blocks. Further, global cache 115 provides CFS 105 and file system I/O logic 110 consistent access to a set of file system blocks cached in the buffer cache pool. Further, global cache 115 uses a reference count mechanism and a hint mechanism as described above herein for managing a set of buffer cache blocks cached in the global cache 115.

Further, a global cache 115 may store metadata objects (e.g., indirect blocks, virtual block pointers) of one or more files of file systems that enables a data storage system to store a single instance of a metadata object in a memory of the data storage system when the metadata object is shared across the one or more files of file systems. Further, in at least some implementations in accordance with the current technique as described herein, a global reusable list is associated with the global cache 115 of the data storage system such that a metadata and/or data object is added to the global reusable list in a least recently used manner when a client releases a reference to the metadata and/or data object which has been provided to the client from the global cache 115. In such a case, a metadata and/or data object that has been added to a global reusable list is either reclaimed by a client at a later time or initialized as a free metadata and/or data object.

A storage pool 125 may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. A disk may be a physical disk within the storage system. A LUN may be a logical unit number which is an identifier for a Logical Unit. Each slice of data may have a mapping on the location of the physical drive where it starts and ends.

Figure 6:
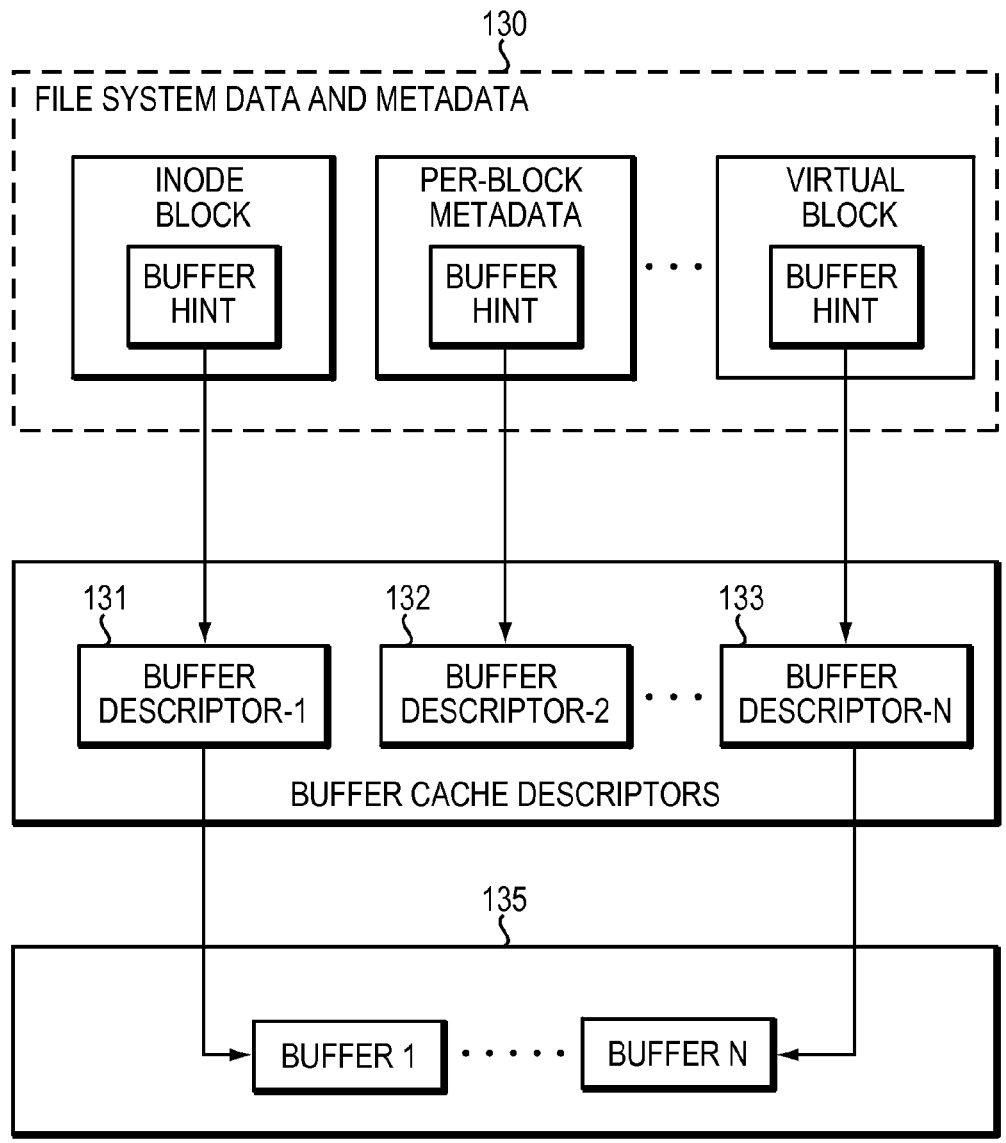

Referring to FIG. 6, shown is a detailed representation of components that may be included in an embodiment using the techniques described herein. With reference also to FIG. 5, in at least one embodiment of the current technique, metadata and/or data of a file system is stored in buffer cache blocks of buffer cache pool 135. Metadata of a file system 130 may include an inode of a file, per-block metadata for file system data blocks, and virtual block for files. Each buffer cache block is represented by a buffer cache descriptor (e.g., 131, 132, 133). Further, a set of buffer cache descriptors (e.g., 131-133) may be managed by global cache 115 and a client may access the global cache 115 for accessing a buffer cache block that may include data and/or metadata for a file system that the client is attempting to access. Thus, a client may access data and/or metadata stored in a buffer cache block cached in global cache 115 if a valid hint exists for the buffer cache block at the time the buffer cache block is accessed.

Figure 7:
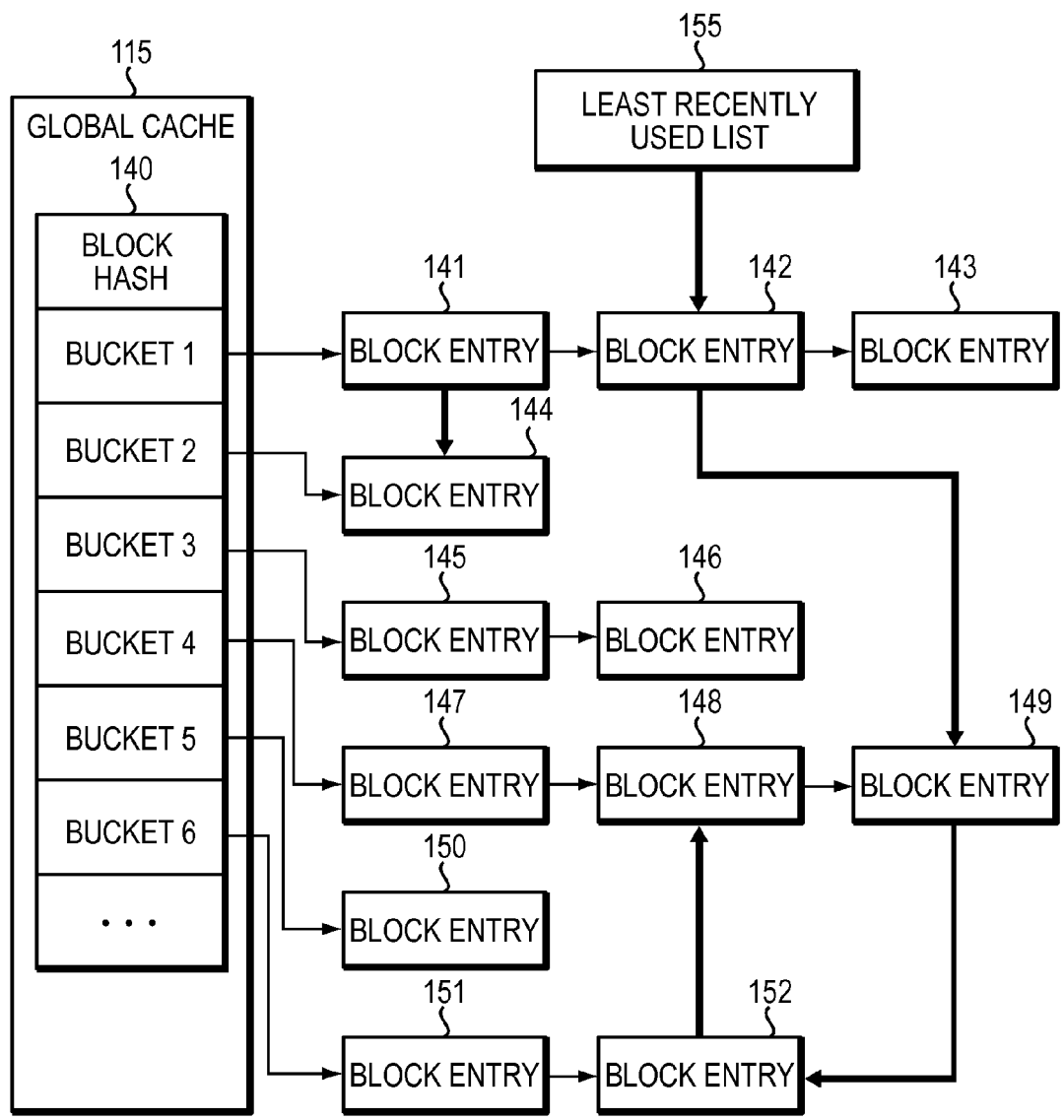

Referring to FIG. 7, shown is a detailed representation of components that may be included in an embodiment using the techniques described herein. With reference also to FIGS. 4-6, in at least one embodiment of the current technique, the global cache 115 is represented by global block hash table 140 for storing information regarding a set of buffer cache blocks of the buffer cache pool that are cached in global cache 115. For example, global block hash 140 may be organized as a set of hash buckets such that each bucket of the set of hash buckets includes one or more entries including information for a buffer cache descriptor that is accessed by a hash key. A hash key may be based on a file system block number of a file. The global block hash 140 may grow to a pre-defined size based on an amount of available memory of file server 23 by reading data and/or metadata of a file from a disk, storing contents of the data and/or metadata in a buffer cache block, and storing information for the buffer cache block in the global cache 115 by associating a buffer cache descriptor with the buffer cache block and adding the buffer cache descriptor to global block hash 140. Further, the global cache 115 may maintain a set of buffer cache descriptors in a least recently used manner such that a global least recently used list 155 tracks a set of buffer cache descriptors that has been released by clients such that the set of buffer cache descriptors are available for reuse and may be recycled. Further, each buffer cache descriptor entry 142, 148, 149, 152 that is a part of the global least recently used list 155 includes a reference count which has a value of zero indicating that no client is holding any reference to the buffer cache entry and the buffer cache entry is not being used by any client. On the other hand, each buffer cache descriptor entry 141, 143-146, 147, 150, 151 that is a part of global cache 115 but not a part of the global least recently used list 155 includes a reference count which has a value greater than zero indicating that one or more clients hold one or more references to the buffer cache descriptor entry indicating that the buffer cache entry is not available for reuse and the buffer cache entry is being used by the one or more clients.

Figure 8:
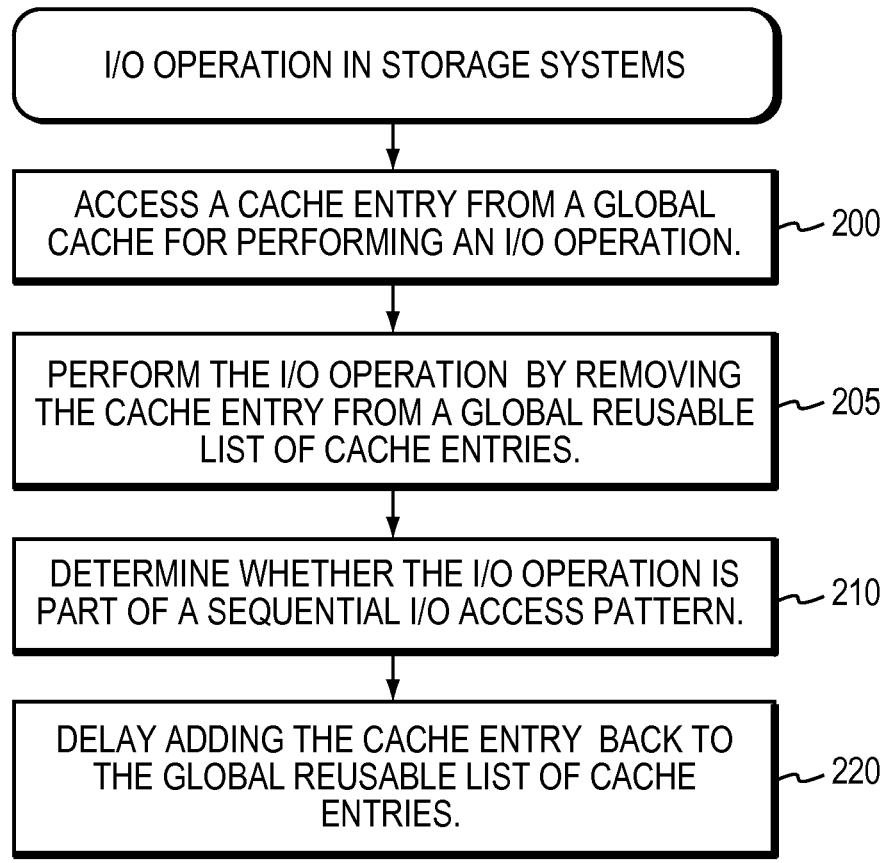
FIG. 8 is a flow diagram illustrating processes that may be used in connection with techniques herein.

Referring to FIG. 8, shown is a flow diagram illustrating the method of managing global caches in data storage systems. With reference also to FIGS. 1-7, in at least one embodiment of the current technique, a global cache 115 is instantiated and initialized when file server 23 boots up. A client issues am I/O request to access metadata (such as indirect block) and/or data of a file system (step 200). If the metadata (such as indirect block) and/or data requested by the client is not found in the global cache 115, a cache entry may be allocated from a global reusable list 155, optionally maintained as a least recently used list, contents of the metadata and/or data are read from a persistent storage, and the metadata and/or data is stored in the newly allocated cache entry (e.g., buffer cache block referred to by a buffer cache block descriptor entry) from the global reusable list 155 of the global cache 115. However, if a cache entry storing the metadata and/or data requested by the client is found in the global cache 115, a reference to the cache entry is acquired and the cache entry is provided to the client for accessing contents of the cache entry. Moreover, if a cache entry storing the metadata and/or data requested by the client is found in the global reusable list 155, the client attempts to reclaim the cache entry by using a hint and upon finding the valid hint, a reference to the cache entry is acquired and the cache entry is provided to the client for accessing contents of the cache entry by removing the cache entry from the global reusable list 155.

Thus, a reference to the cache entry storing the metadata and/or data is provided to the client (step 205). Further, the client indicates an access lock (e.g., shared mode, excusive mode) when accessing metadata and/or data. A determination is made as to whether the I/O request is part of a sequential I/O access pattern indicating that there is a high probability that the cache entry may be accessed frequently and repeatedly within a short period of time (step 210). Based on the determination that the I/O request is part of the sequential I/O access pattern, delay adding the cache entry back to the global reusable list 155 by delaying release of the reference to the cache entry (step 220). Thus, by delaying the release of the reference taken on the cache entry, the cache entry may be accessed frequently and repeatedly within a short period of time by the client without having to acquire and release a global lock each time the cache entry is accessed because the client does not need to remove the cache entry from the global reusable list 155 and then add the cache entry back to the global reusable list 155 for each I/O access during that period of time thereby enabling a user to access the cache entry within that period of time without having to acquire and release a system lock each time the cache entry is accessed.

In at least one embodiment of the current technique as described herein, contents of metadata such as an indirect block entry of an inode of a file are stored in a memory of file server 23 using an in-memory metadata object (referred to here as "indirect block buffer cache"). An indirect block buffer cache is associated with a buffer cache block that is allocated from a buffer cache pool and may be cached in global cache 115. Generally, an indirect block entry includes one or more pointers to data blocks. However, in some cases such as a direct mapped file, an indirect block entry may be used as a place holder for an indirect block pointer that is computed at a later time.

Further, metadata object such as an indirect block entry cached in global cache 115 is accessed using an access lock (such as a read/write lock) in order to ensure consistency of the indirect block entry when the indirect block entry is accessed by more than one client. An access lock is used to protect an indirect block entry that is shared across versions of a file. An access lock is acquired each time an indirect block entry of global cache 115 is referenced for a read or write I/O request. The life cycle of an access lock is managed by a client that acquire the access lock for referencing an indirect block entry. A client releases an access lock when the client acquires a reference to an indirect block entry. Additionally, an unreferenced indirect block entry included in global cache 115 may be recycled when global cache 115 is unable to create a new cache entry. Further, once an indirect block entry is provided to a user or client for storing metadata of a file system by removing the indirect block entry from the global reusable list 155, the indirect block entry is considered as being in use by the user. An indirect block entry is added back to the global reusable list 155 when a user finishes using the indirect block entry.

An indirect block entry includes a hold count in order to manage access to the indirect block entry. Similarly, a buffer cache block associated with an indirect block entry also includes a hold count in order to manage access to the buffer cache block via the indirect block entry. The hold count value of an indirect block entry is incremented indicating that a hold is placed on the indirect block entry, when a method is invoked to find the indirect block entry in the global cache 115. Further, if the indirect block entry is added to a dirty list, the hold count is incremented again. The hold placed on an indirect block entry by using the hold count avoids the indirect block entry to be reused by another user. If the hold count of an indirect block entry is at least one, the hold count of the buffer cache block of the indirect block entry is also at least one such that the indirect block entry may not be recycled. If a user issues a request to get a buffer cache block associated with an indirect block entry, a reference is added to the buffer cache block of the indirect block entry by incrementing the hold count of the buffer cache block such that the user must release the hold on the buffer cache block once the user finish using the buffer. Further, in such a case, the user must release the reference to the indirect block entry as well by decrementing the hold count of the indirect block entry. If the hold count of an indirect block entry becomes zero, the indirect block entry transitions to a reusable state indicating that the indirect block entry may be reused by another user by transferring the indirect block entry to a global least recently used list. Further, in such a case, the hold count on the buffer cache block of the indirect block entry also becomes zero. Thus, in such a case, a hint is used in order to determine whether the buffer cache block of the indirect block entry is valid at the time the indirect block entry is reclaimed.

In at least one embodiment of the current technique, a client sends an I/O request (e.g., read, write) such that data associated with the I/O request is not cached in the global cache 115 of a data storage system. With reference also to FIGS. 1-7, a client sends an I/O request to a data storage system. Upon receiving the I/O request for reading from or writing to data and/or metadata of a file of a file system at a specified file offset, the file system cache management logic ("CFS") 105 attempts to find reference (or "hint") to a data block in a file fork object associated with the file. The CFS 105 checks a bufmap table of the file fork object by using a logical block number associated with the file offset. Upon determining that an entry associated with the logical block number does not exists in the file fork object, the data storage system issues a read request to file system I/O logic 110. The file system I/O logic 110 first performs a mapping operation in order to determine a file system block number ("FSBN") associated with the logical block number of data that needs to be read from a storage device. Then, based on the file system block number, a determination is made as to whether a buffer cache descriptor exists in the global cache 115 such that the global cache 115 may refer to a buffer cache block including metadata and/or data associated with the I/O request. If such a buffer cache descriptor exists in the global cache 115 and is part of a global reusable list 155, a lock is acquired and the buffer cache descriptor is removed from the global reusable list 155. A reference is taken on the buffer cache descriptor and is provided to the client. Further, the lock is released.

However, upon determining that no such buffer cache descriptor exists in the global cache 115, a buffer cache block is allocated from the buffer cache pool. A read I/O operation is performed on a storage device to read the data and/or metadata of the file associated with the I/O request. The data read from the storage device is written to the buffer cache block. A buffer cache descriptor entry is created in the global cache 115. The newly created buffer cache descriptor entry is initialized by associating a buffer cache block with the buffer cache descriptor entry. Further, a commit buffer operation is performed in order to update information of the buffer cache descriptor entry such as an offset, a length, a file system block number and a state. The file system I/O logic 110 finishes the read I/O operation successfully by releasing resources that may have been held in order to read the data from the storage device. Information regarding the buffer cache descriptor entry is provided to file system cache management logic ("CFS") 105 such that the file fork object adds a hint for the buffer cache block. CFS 105 provides the buffer cache block to the client such that the client can read data from the buffer cache block. When the client finish accessing the data, the hold on the buffer cache descriptor entry is released. A hold prevents a buffer cache descriptor entry from being recycled by a data storage system. If the value of a hold for a buffer cache descriptor entry reaches zero, the buffer cache descriptor entry become eligible for recycling by a data storage system by adding the buffer cache descriptor entry to global list of reusable cache entries 155 such that the list may be maintained in a least recently used manner. Further, a lock is acquired and then released for adding the buffer cache descriptor entry to global list of reusable cache entries 155.

Generally, a metadata object such as an indirect block may include for example, up to 1024 block pointer entries (e.g., data block pointers, indirect block pointers). When a file system accesses an indirect block for reading from or writing to contents of the indirect block, the contents of the indirect block are read from a persistent storage and stored in a buffer cache block of a global cache 115 if the contents of the indirect block are not already cached in the global cache 115. Thus, if a client accesses a file system block pointed to by any one of the 1024 block pointers of an indirect block that has been cached in global cache 115, the client must take a reference to a buffer cache block associated with the indirect block each time the client accesses any one of the 1024 block pointers of the indirect block. Further, in such a case, each time a buffer cache block descriptor associated with any one of the 1024 block pointers of the indirect block which is cached in global reusable list 155 of global cache 115 is accessed, a global system lock is acquired and released. Thus, in such a case, using a conventional technique, a global system lock may be acquired and released up to 1024 times when a client accesses block pointer entries of an indirect block as part of a sequential I/O access pattern. However, it should be noted that block pointer entries of an indirect block may be accessed in any order and a client is not required to access the block pointer entries in a sequential order.

By contrast, in at least one embodiment of the current technique as described herein, by delaying releasing a reference to a buffer cache block associated with a block pointer of an indirect block cached in global reusable list 155 of global cache 115, a global system lock may only be acquired and released once even though a client accesses up to 1024 block pointer entries of an indirect block as part of a sequential I/O access pattern because the client holds a reference to the indirect block for a predefined time interval such that during that time interval, the client may access any one of the 1024 block pointer entries of the indirect block without having to remove the buffer cache block entry associated with the indirect block entry from the global reusable list 155 and then add back the buffer cache block entry associated with the indirect block entry to the global reusable list 155 during each I/O access.

In at least one embodiment of the current technique, upon determining that there is a high probability that content of a same buffer cache entry may be accessed repeatedly within a specific time interval, a reference to the buffer cache entry is taken for accessing the buffer cache entry but that reference is not released for the specific time interval which in turns delay adding the buffer cache entry to global reusable list 155 for the specific time interval after the buffer cache entry has been accessed and used by a client. In at least one embodiment, one mechanism for determining a time interval after which a reference to a buffer cache entry may be released is based on a system timer such that the system timer starts when the reference is taken on the buffer cache entry and the reference is released when the timer expires at the end of the time interval. In at least one embodiment of the current technique, a time interval for a system timer may be based on information such as amount of time required to access entire contents of a buffer cache block, amount of time required to perform I/O operations and an offset at which an I/O operation starts.

In at least one embodiment of the current technique, a second mechanism for determining a time interval after which a reference to a buffer cache entry may be released is based on a timer thread that maintains a timer. In such a mechanism, a worker thread performing an I/O operation may post an event to a timer thread when a reference is taken on a buffer cache entry cached in global cache 115 such that the timer thread starts a timer for a specific time interval upon receiving the event such that the reference to the buffer cache entry is released at the end of the specific time interval when the timer thread stops the timer. It should be noted that a timer used for determining when to release a reference to a buffer cache entry of a global cache may be based on a time measurement mechanism or a reference counting mechanism. Further, it should be noted that a buffer cache entry of a global cache may be accessed repeatedly as a result of a sequential I/O access pattern, a leaf access pattern, simultaneous access by clients, and/or simultaneous access of one or more portions of an indirect block.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing global caches in data storage systems, the method comprising:
   accessing a cache entry of a global cache of a data storage system upon receiving a request to perform an I/O operation on a storage object, wherein the cache entry is associated with the storage object, wherein accessing the cache entry includes acquiring a lock, holding a reference to the cache entry, releasing the lock, and providing the cache entry to a client, wherein the global cache includes a set of buffer cache objects managed by a set of buffer cache descriptors, wherein the storage object includes a file of a file system, wherein the cache entry includes information regarding metadata of the file system;
   determining whether the I/O operation is associated with a sequential access indicating a high probability of the cache entry being accessed at least two times in a time period; and
   based on the determination, delaying releasing the reference to the cache entry by the client for the time period, wherein delaying releasing the reference to the cache entry includes delaying adding information regarding the cache entry to a reusable list of cache entries configured to provide the cache entries for reuse by the data storage system, wherein the client accesses the cache entry during the time period without removing the cache entry from the reusable list and without acquiring and releasing the lock.

2. The method of claim 1, further comprising:
   removing the cache entry from a global reusable list associated with the global cache, wherein the global reusable list includes a linked list, wherein the linked list includes a set of metadata objects, wherein each metadata object of the set of metadata objects is available as a free entry, wherein the linked list is managed in a least recently used manner.

3. The method of claim 2, wherein a metadata object stored in the global reusable list includes an indirect block entry.

4. The method of claim 1, wherein the global cache includes a global metadata cache.

5. The method of claim 4, wherein the global metadata cache includes a set of global data block cache descriptors for storing information for a set of buffer cache objects stored in a memory of the data storage system, wherein a global data block cache descriptor of the set of global data block cache descriptors is associated with a buffer cache object of the set of buffer cache objects, wherein a buffer cache object stores metadata of a file of a file system.

6. The method of claim 2, further comprising:
   adding a metadata object to the global reusable list based on a use recency information of the metadata object.

7. The method of claim 1, wherein a file of a file system is associated with an inode, wherein the inode of the file includes a set of indirect blocks, wherein each indirect block of the set of indirect blocks is represented by an indirect block entry.

8. The method of claim 1, wherein releasing the reference to the cache entry is delayed for a predetermined time interval.

9. The method of claim 1, wherein the sequential access includes accessing a cache entry associated with a storage object repetitively.

10. The method of claim 2, further comprising:
    receiving a request to access a metadata object of a file of a file system;
    determining, whether to allocate a free cache entry from the global reusable list based on whether the metadata object is found in the global cache;
    based on the determination, allocating the free cache entry from the global reusable list; and
    holding the reference to the free cache entry for a predetermined time interval.

11. A system for use in managing global caches in data storage systems, the system comprising a processor configured to:
    access a cache entry of a global cache of a data storage system upon receiving a request to perform an I/O operation on a storage object, wherein the cache entry is associated with the storage object, wherein accessing the cache entry includes acquiring a lock, holding a reference to the cache entry, releasing the lock, and providing the cache entry to a client, wherein the global cache includes a set of buffer cache objects managed by a set of buffer cache descriptors, wherein the storage object includes a file of a file system, wherein the cache entry includes information regarding metadata of the file system;
    determine whether the I/O operation is associated with a sequential access indicating a high probability of the cache entry being accessed at least two times in a time period; and
    delay, based on the determination, releasing the reference to the cache entry by the client for the time period, wherein delaying releasing the reference to the cache entry includes delaying adding information regarding the cache entry to a reusable list of cache entries configured to provide the cache entries for reuse by the data storage system, wherein the client accesses the cache entry during the time period without removing the cache entry from the reusable list and without acquiring and releasing the lock.

12. The system of claim 11, further comprising:
remove the cache entry from a global reusable list associated with the global cache, wherein the global reusable list includes a linked list, wherein the linked list includes a set of metadata objects, wherein each metadata object of the set of metadata objects is available as a free entry, wherein the linked list is managed in a least recently used manner.

13. The system of claim 12, wherein a metadata object stored in the global reusable list includes an indirect block entry.

14. The system of claim 11, wherein the global cache includes a global metadata cache.

15. The system of claim 14, wherein the global metadata cache includes a set of global data block cache descriptors for storing information for a set of buffer cache objects stored in a memory of the data storage system, wherein a global data block cache descriptor of the set of global data block cache descriptors is associated with a buffer cache object of the set of buffer cache objects, wherein a buffer cache object stores metadata of a file of a file system.

16. The system of claim 12, further comprising:
add a metadata object to the global reusable list based on a use recency information of the metadata object.

17. The system of claim 11, wherein a file of a file system is associated with an inode, wherein the inode of the file includes a set of indirect blocks, wherein each indirect block of the set of indirect blocks is represented by an indirect block entry.

18. The system of claim 11, wherein releasing the reference to the cache entry is delayed for a predetermined time interval.

19. The system of claim 11, wherein the sequential access includes accessing a cache entry associated with a storage object repetitively.

20. The system of claim 12, further comprising:
receive a request to access a metadata object of a file of a file system;
determine, whether to allocate a free cache entry from the global reusable list based on whether the metadata object is found in the global cache;
allocate, based on the determination, the free cache entry from the global reusable list; and
hold the reference to the free cache entry for a predetermined time interval.

* * * * *